United States Patent
Amento et al.

(10) Patent No.: US 10,664,945 B2
(45) Date of Patent: *May 26, 2020

(54) DIRECT MEMORY ACCESS FOR GRAPHICS PROCESSING UNIT PACKET PROCESSING

(71) Applicant: AT&T Intellectual Property I, L.P., Atlanta, GA (US)

(72) Inventors: Brian S. Amento, Port Murray, NJ (US); Kermit Hal Purdy, Bernardsville, NJ (US); Minsung Jang, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,038

(22) Filed: Jun. 24, 2019

(65) Prior Publication Data
US 2019/0340725 A1 Nov. 7, 2019

Related U.S. Application Data

(63) Continuation of application No. 15/967,808, filed on May 1, 2018, now Pat. No. 10,332,235.

(51) Int. Cl.
*G06T 1/20* (2006.01)
*G06T 1/60* (2006.01)
(Continued)

(52) U.S. Cl.
CPC ............ *G06T 1/60* (2013.01); *G06F 12/0835* (2013.01); *G06F 13/128* (2013.01); *G06F 13/28* (2013.01);
(Continued)

(58) Field of Classification Search
None
See application file for complete search history.

(56) References Cited

U.S. PATENT DOCUMENTS 8,458,280 B2 6/2013 Hausauer et al.
8,706,927 B2 4/2014 Glaeser
(Continued)

FOREIGN PATENT DOCUMENTS

WO WO 2014137008 A1 9/2014
WO WO 2016/195624 A1 12/2016

OTHER PUBLICATIONS

Capodieci, Nicola; Burgio, Paolo; "Efficient Implementation of Genetic Algorithms on GP-GPU with scheduled persistent CUDA threads"; Dec. 2015; 2015 Seventh International Symposium on Parallel Architectures, Algorithms and Programming; p. 7-8. (Year: 2015).*

(Continued)

*Primary Examiner* — Joni Hsu (57) ABSTRACT

Devices for coordinating or establishing a direct memory access for a network interface card to a graphics processing unit, and for a network interface card to access a graphics processing unit via a direct memory access are disclosed. For example, a central processing unit may request a graphics processing unit to allocate a memory buffer of the graphics processing unit for a direct memory access by a network interface card and receive from the graphics processing unit a first confirmation of an allocation of the memory buffer. The central processing unit may further transmit to the network interface card a first notification of the allocation of the memory buffer of the graphics processing unit, poll the network interface card to determine when a packet is received by the network interface card, and transmit a second notification to the graphics processing unit that the packet is written to the memory buffer.

20 Claims, 6 Drawing Sheets

(51) Int. Cl.
*G06F 12/0831* (2016.01)
*G06F 13/28* (2006.01)
*G06F 13/12* (2006.01)

(52) U.S. Cl.
CPC .......... *G06T 1/20* (2013.01); *G06F 2212/621* (2013.01); *G06F 2213/3808* (2013.01); *G06T 2200/28* (2013.01)

(56) References Cited

U.S. PATENT DOCUMENTS

| | | | |
|---|---|---|---|
| 8,990,451 B2 | 3/2015 | Couvee et al. | |
| 9,112,889 B2 | 8/2015 | Evans et al. | |
| 9,253,287 B2 | 2/2016 | Krishnan et al. | |
| 9,411,775 B2 | 8/2016 | Sharp et al. | |
| 9,535,873 B2 | 1/2017 | Froening | |
| 9,582,463 B2 | 2/2017 | Cheng et al. | |
| 9,602,437 B1 | 3/2017 | Bernath | |
| 9,602,636 B1 | 3/2017 | Vincent et al. | |
| 9,658,981 B2 | 5/2017 | Rossetti | |
| 9,792,248 B2 | 10/2017 | Shamis et al. | |
| 9,860,189 B2 | 1/2018 | Butcher et al. | |
| 2007/0112996 A1* | 5/2007 | Manula .................. | G06F 13/423 710/310 |
| 2009/0254683 A1 | 10/2009 | Camer et al. | |
| 2010/0332755 A1 | 12/2010 | Bu et al. | |
| 2013/0139263 A1 | 5/2013 | Beyah et al. | |
| 2014/0055467 A1 | 2/2014 | Bittner et al. | |
| 2014/0149528 A1 | 5/2014 | VandaVaart et al. | |
| 2015/0288624 A1 | 10/2015 | Raindel et al. | |
| 2016/0077872 A1 | 3/2016 | Gu et al. | |
| 2016/0117277 A1 | 4/2016 | Raidnel et al. | |
| 2016/0226967 A1 | 8/2016 | Zhang et al. | |
| 2016/0335738 A1 | 11/2016 | Chen et al. | |
| 2017/0147516 A1 | 5/2017 | De | |
| 2017/0180272 A1 | 6/2017 | Bernath | |
| 2017/0277655 A1 | 9/2017 | Das et al. | |

OTHER PUBLICATIONS

Pang et al., "The TH Express high performance interconnect networks", Frontiers of Computer Science vol. 8, Issue 3 (2014). pp. 357-366. Jun. 2014 https://www.researchgate.net/profile/Zhengbin_Pang/publication/272012082_The_TH_Express_high_performance_interconnect_networks/links/56c522e408ae736e704712fc/The-TH-Express-highperformance-interconnect-networks.pdf.

Silberstein et al., "GPUnet: Networking abstractions for GPU programs", ACM Transactions on Computing Systems (TOCS) vol. 0, Issue 0, Article 0 (2016). 32 Pages. Sep. 2016 http://www.cs.utexas.edu/users/witchel/pubs/silberstein16tocsgpunet.pdf.

Kaufmann et al., "High Performance Packet Processing with FlexNIC", ASPLOS '16 Apr. 2-6, 2016, Atlanta, Georgia, USA 15 Pages. https://syslab.cs.washington.edu/papers/flexnic-asplos16.pdf.

Kalia et al., "Design Guidelines for High Performance RDMA Systems", 2016 USENIX Annual Technical Conference (2016), Denver, CO, USA, 14 pages. Jun. 2016 https://www.cs.cmu.edu/~akalia/doc/atc16/rdma_bench_atc.pdf.

Miao et al., "SoftRDMA: Rekindling High Performance Software RDMA over Commodity Ethernet", APNet'17, Aug. 3-4,2017, Hong Kong, China. 7 Pages. https://conferences.sigcomm.org/events/apnet2017/papers/softrdma-miao.pdf.

\* cited by examiner

DIRECT MEMORY ACCESS FOR GRAPHICS PROCESSING UNIT PACKET PROCESSING

This application is a continuation of U.S. patent application Ser. No. 15/967,808, filed May 1, 2018, now U.S. Pat. No. 10,332,235, which is herein incorporated by reference in its entirety.

The present disclosure relates to devices, methods, computer-readable media, and systems for coordinating a direct memory access for a network interface card to a graphics processing unit, for establishing a direct memory access for a network interface card to a graphics processing unit, and/or for a network interface card to access a graphics processing unit via a direct memory access.

BACKGROUND

Packet processing has traditionally been performed on specialized hardware built into network routers and switches. In order to provide more flexibility and minimize expenses, networking tasks have been moving to virtualized frameworks built on top of commodity hardware. This solution works for current network hardware, but as network cards increase to 100 Gb and beyond, the amount of compute power necessary to process packets at line speed is also increasing.

SUMMARY

In one example, the present disclosure describes a device, computer-readable medium and method for coordinating a direct memory access for a network interface card to a graphics processing unit. For instance, in one example, a central processing unit may request a graphics processing unit to allocate a memory buffer of the graphics processing unit for a direct memory access by a network interface card and receive from the graphics processing unit a first confirmation of an allocation of the memory buffer of the graphics processing unit. The central processing unit may further transmit to the network interface card a first notification of the allocation of the memory buffer of the graphics processing unit, poll the network interface card to determine when a packet is received by the network interface card, and transmit a second notification to the graphics processing unit that the packet is written to the memory buffer.

In another example, the present disclosure describes a device, computer-readable medium and method for establishing a direct memory access for a network interface card to a graphics processing unit. For instance, in one example, a graphics processing unit may allocate a memory buffer of the graphics processing unit for a direct memory access by a network interface card, receive from a central processing unit a first notification that a packet is written to the memory buffer by the network interface card via the direct memory access, and apply a kernel to the packet. The graphics processing unit may then notify the central processing unit that the kernel is applied.

In still another example the present disclosure describes a device, computer-readable medium and method for a network interface card to access a graphics processing unit via a direct memory access. For instance, in one example, a network interface card may receive a notification of an allocation of a memory buffer of a graphics processing unit for a direct memory access. The network interface card may then receive a packet, write the packet to the memory buffer, and receive a second notification that a processing of the packet by the graphics processing unit is complete. The network interface card may then read the packet from the memory buffer via the direct memory access in response to the second notification.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

The present disclosure describes devices, computer-readable media, methods, and systems for coordinating a direct memory access for a network interface card to a graphics processing unit, for establishing a direct memory access for a network interface card to a graphics processing unit, and/or for a network interface card to access a graphics processing unit via a direct memory access. Packet processing has traditionally been performed on specialized hardware built into network routers and switches. In order to provide more flexibility and minimize expenses, networking tasks have been moving to virtualized frameworks built on top of commodity hardware. This solution works for current network hardware, but as network cards increase to 100 Gb and beyond, the amount of compute power necessary to process packets at line speed is also increasing. In many instances, central processing unit (CPU) based architectures are not able to keep up.

Examples of the present disclosure provide graphics processing unit (GPU)-based devices (e.g., routers) for high bandwidth, low latency packet processing. Many calculations assume that GPU parallelization techniques can increase packet processing speeds by factors greater than 10. However, these studies assume that the packet data is already in the GPU memory. In a real networking situation, copying packets into the GPU can be slow and may offset the benefits of the increased processing power of the GPU. This issue affects a range of GPGPU (general purpose computing on GPU) tasks. Remote Direct Memory Access (RDMA) techniques provided by GPUDirect have been proposed to overcome this issue. GPUDirect RDMA is optimized for burst data transfers which work for most GPGPU tasks. However, packet processing differs from traditional GPGPU tasks because the data is streaming over a network link and cannot take advantage of large burst transfers.

Examples of the present disclosure provide an architecture for GPU packet processing that overcomes the data transfer bottleneck of GPUDirect RDMA, allowing the full benefit of the GPU for packet processing and other streaming data applications. In particular, examples of the present disclosure initiate direct memory access (DMA) transfers from a network interface card (NIC) to a graphics processing unit (GPU). This is the reverse of other RDMA architectures and results in a substantial increase in transfer speed. In one example, to eliminate performance overhead, polling techniques are used for device access instead of interrupt processing. In one example, a user space pull mode driver is used by a central processing unit (CPU) to interact with the NIC and the GPU. For instance, the user space pull mode driver may comprise a Data Plane Development Kit (DPDK) driver.

Examples of the present disclosure have proven performance at line speeds on a 40 GB NIC with GPU resources left to spare. In addition, it should be noted that although examples are described herein primarily in connection with GPU-based packet processing (e.g., routing), in other, further, and different examples, the present disclosure may provide an architecture where another type of co-processor, such as a field-programmable gate array (FPGA), may be used for parallel processing of packets and where a NIC may use DMA to access such a co-processor. These and other features of the present disclosure are described in greater detail below and in connection with FIGS. 1-6.

Figure 1:
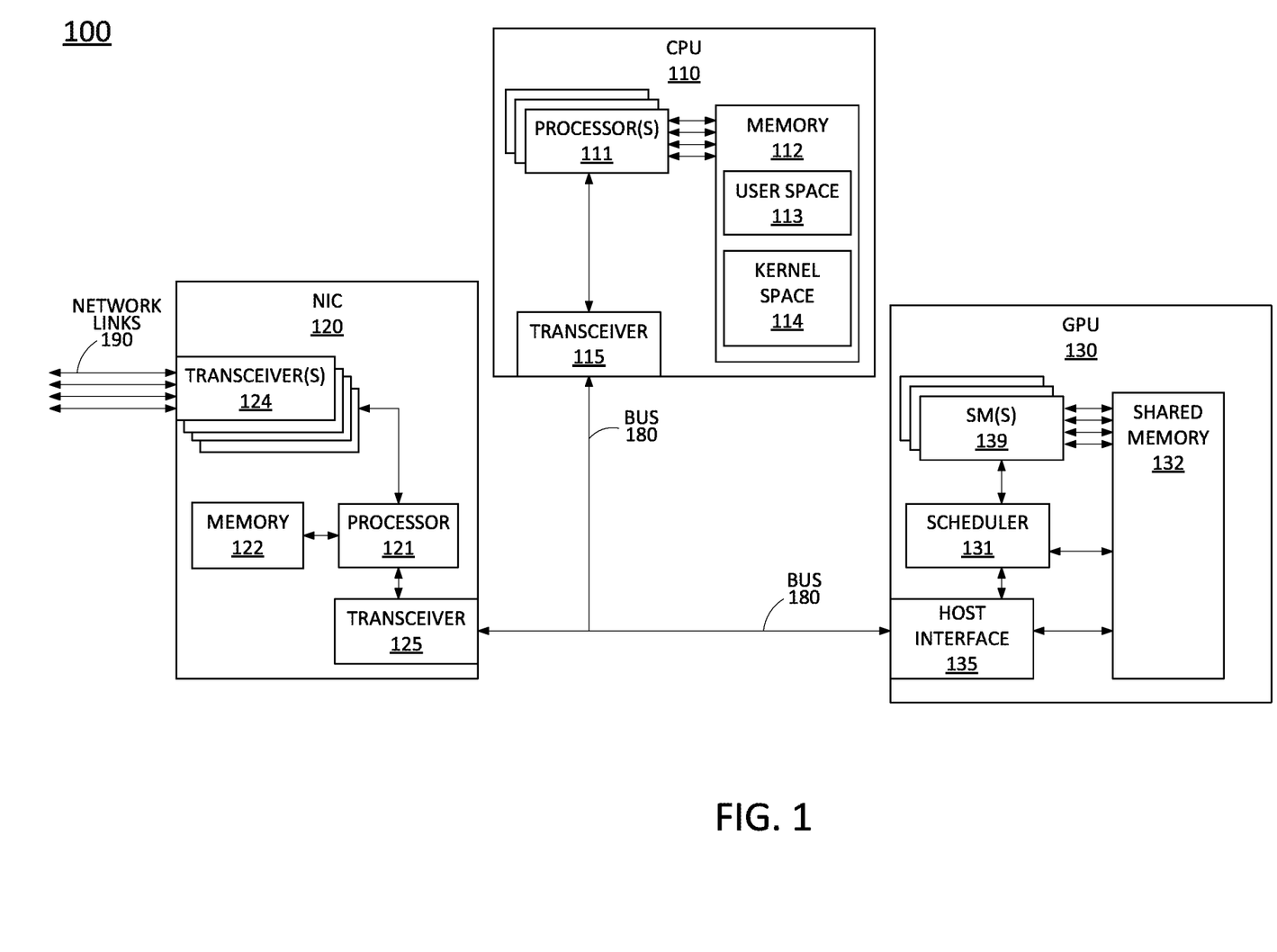
FIG. 1 illustrates an example system or device, e.g., a router, in accordance with the present disclosure.

To aid in understanding the present disclosure, FIG. 1 illustrates an example device, or system 100, e.g., a router, in accordance with the present disclosure. As illustrated in FIG. 1, the system 100 includes a central processing unit (CPU) 110, a network interface card (NIC) 120, and a graphics processing unit (GPU) 130. The CPU 110 may include one or more processors 111, a memory 112, which may be logically segregated into a user space 113 and a kernel space 114, and a transceiver 115 for communicating with other devices or modules, such as NIC 120 and GPU 130 over a bus 180. The bus 180 may comprise, for example, a Peripheral Component Interface (PCI) bus, or a Peripheral Component Interface express (PCIe) bus.

NIC 120 may include a plurality of transceivers 124 for sending and receiving data via network links 190. For instance, network links 190 may represent connections to other devices and systems via an Ethernet network, or the like. In the example of FIG. 1, transceivers 124 may be for wired communications, optical communications, Layer 2 routing, Layer 3 routing, and so forth. However, in another example, transceivers 124 may be for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), and so forth. In the example of FIG. 1, NIC 120 may include an on-board processor 121 and a memory 122. As further illustrated in FIG. 1, NIC 120 may also include a transceiver 125, e.g., a PCI or PCIe transceiver for communicating with CPU 110 and GPU 130 via bus 180.

GPU 130 may include a host interface 135, e.g., a PCI or PCIe transceiver (PHY) for communicating with CPU 110 and NIC 120 via bus 180. In addition, GPU 130 may include a plurality of streaming multiprocessors (SMs) 139, a shared memory 132 that is accessible to a plurality of SMs 139, and a scheduler 131 for distributing kernels and data processing assignments to various SMs 139. In one example, GPU 130 may be configured, e.g., by CPU 110, to perform various packet routing operations in accordance with the present disclosure. For instance, kernel code may be loaded to the SMs of GPU 130 by CPU 110, wherein the kernel code, when executed by one of SMs 139 and/or core(s) of the SMs 139, performs various routing operations such as: Internet Protocol (IP) address filtering, port filtering, packet classification, encapsulation/decapsulation (e.g., for label switched routing (LSR)), deep packet inspection (DPI) (e.g., for malicious code detection), maintaining counters (e.g., for flow detection, scan detection, etc.), load balancing (e.g., for congested links), and so forth.

Figure 6:
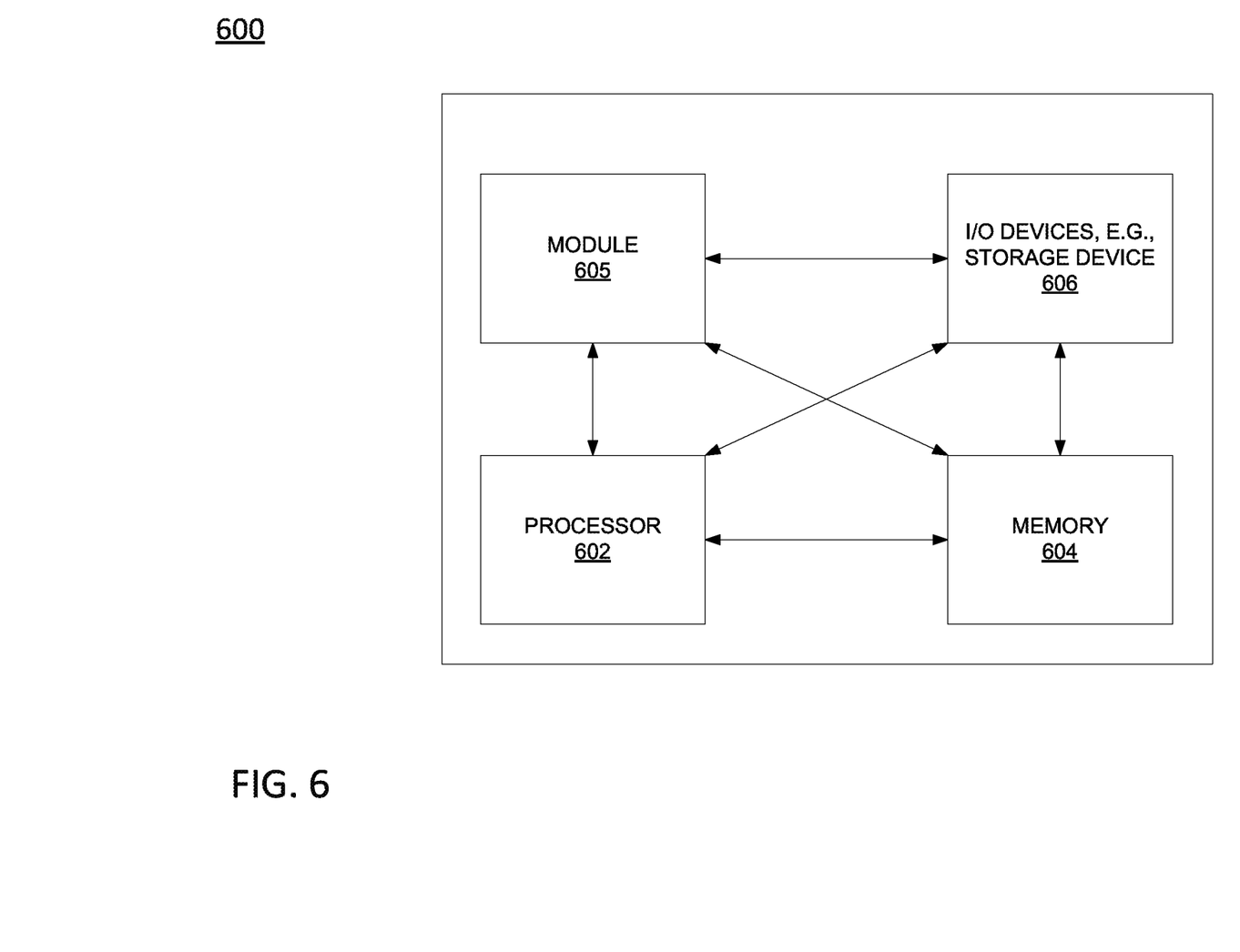
FIG. 6 illustrates an example high-level block diagram of a computer specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure. In addition, a processing system may refer to a component of a computing device such as one or more streaming multiprocessors (SMs), a processor of a CPU, and so forth. It should also be noted that various components may be omitted from illustration in the example of FIG. 1, such as one or more registers present in CPU 110, NIC 120, and/or GPU 130, CPU or SM cores, dynamic random access memory (DRAM), warp schedulers, and so forth present in the SM(s) 139, additional NICs, non-volatile memory (NVM) or storage devices connected to bus 180, and so forth. In one example, system memory (e.g., DRAM or the like) may be shared among all or a plurality of components of system 100 and may be accessible via bus 180. For instance, an L2 cache may physically reside on one or more memory devices external to CPU 110 and GPU 130. However, for illustrative purposes, examples herein are described where CPU 110 uses an internal/local memory 112 (host memory) and GPU 130 uses an internal/local shared memory 132 (device memory). The interactions and communications between components of the system 100 are discussed in greater detail below in connection with the example timing diagram of FIG. 2.

Figure 2:
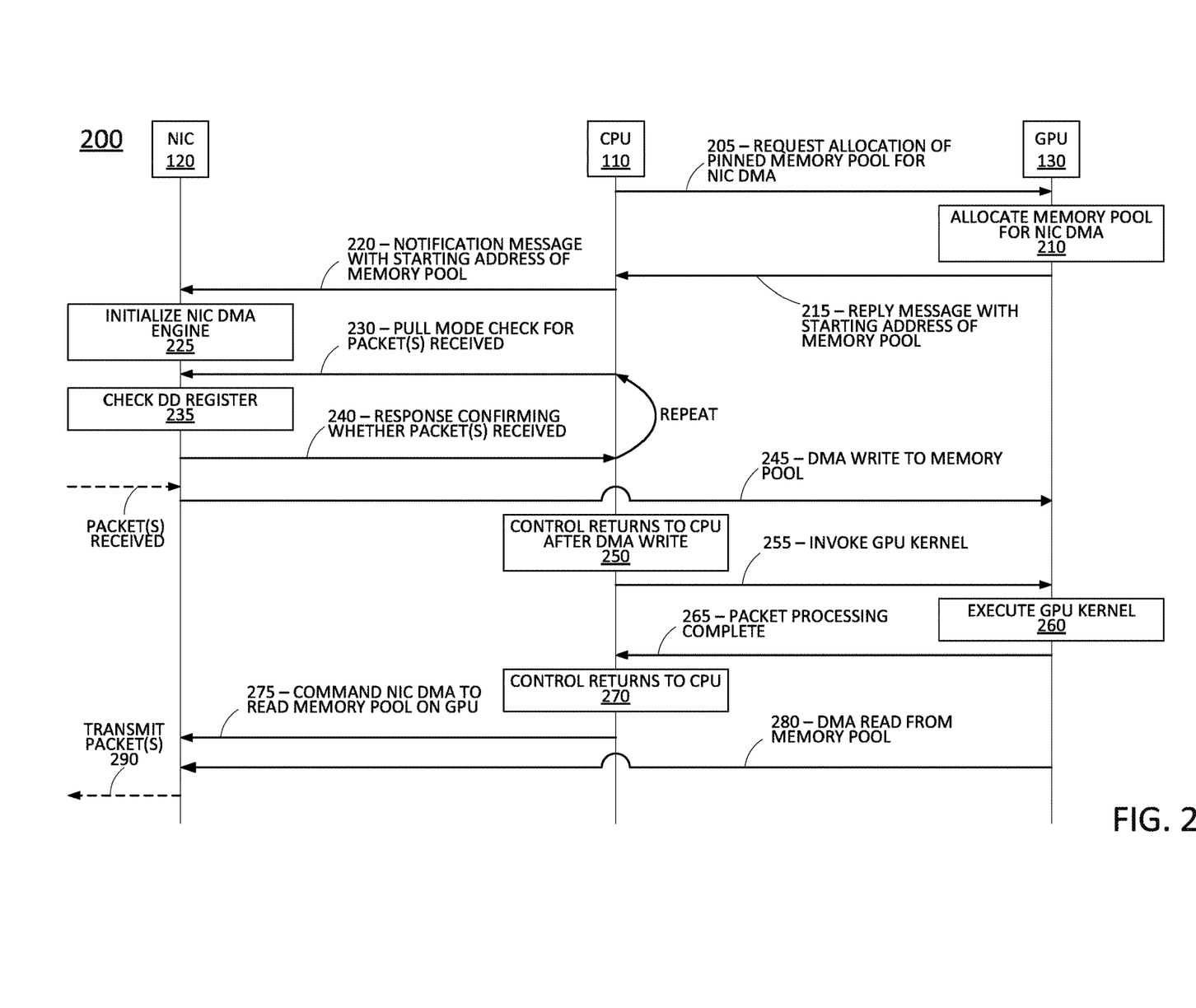
FIG. 2 illustrates an example timing diagram for operation of a system or device in accordance with the present disclosure.

To aid in understanding the present disclosure, FIG. 2 illustrates an example timing diagram of a process 200 for operation of a GPU-based packet processing system, such as the system 100, according to the present disclosure. As illustrated in FIG. 2, the process 200 may begin with stage 205, where CPU 110 may send a message to the GPU 130 requesting or instructing GPU 130 to allocate a pinned memory pool on the GPU memory for a direct memory access (DMA) by NIC 120. At stage 210, the GPU 130 may allocate the memory pool for use by a DMA engine of NIC 120. In one example, the memory pool is pinned to a PCIe physical memory address. In one example, the pinned memory pool may comprise a shared ring buffer that is readable and writeable by both the NIC 120 and GPU 130.

In addition, in accordance with examples of the present disclosure the pinned memory pool is pinned to the shared memory 132. In other words, the pinned memory pool is guaranteed to reside within GPU 130 and may not utilize system memory, host memory, or the like, which may be external to GPU 130.

Stage 215 may comprise GPU 130 sending a reply message to the CPU 110 indicating that the pinned memory pool has been allocated and also indicating a starting address of the pinned memory pool. In one example, the reply message may also include a length/size of the pinned memory pool. In another example, the length/size may be implied in accordance with a requested size provided by the CPU 110 in the message of operation 205. In response to receiving the starting address of the pinned memory pool, CPU 110 may then send a message to the NIC 120 at stage 220. The message may indicate an authorization for the DMA engine of NIC 120 to access the GPU memory (i.e., the pinned memory buffer portion) at the given address. The message may also include a size of the pinned memory pool. At stage 225, the processor 121 of the NIC 120 may initialize parameters of the DMA engine. The DMA engine of NIC 120 may comprise codes stored in memory 122 and executed by processor 121, for example. The initialization of DMA engine may include various operations. For instance, a first variable comprising a write pointer may be initialized to the starting address received from CPU 110, a second variable may be initialized to store an ending address of the pinned memory pool, e.g., so that the write pointer can be reset to the starting address when the end of the pinned memory pool is reached, a third variable comprising a read pointer may be initialized to the starting address, and so forth.

Once the DMA engine of NIC 120 is initialized, CPU 110 may begin polling the NIC 120 at stage 230 to determine if any packet(s) has/have been received by NIC 120. In one example, the polling comprises one or more of the processors 111 of CPU 110 performing operations in accordance with a poll mode driver residing in user space 113 of memory 112. In one example, the poll mode driver may comprise a universal input/output (UIO) user space driver. Advantageously, such a driver does not require the invocation of system calls to the kernel space for input/output reads and writes, and avoids delays associated therewith. In one example, the pull mode driver may comprise a Data Plane Development Kit (DPDK) user space driver that operates in pull mode, e.g., without interrupts, and without context switching. However, in accordance with the present disclosure, such a DPDK user space driver may be modified or otherwise configured to not copy data to host memory (e.g., memory 112 of CPU 110).

In response to a polling message at stage 230, the NIC 120 may check a data delivery (DD) register at stage 235. For instance, the register may be set whenever a packet, or a plurality of packets, is received via network links 190. For instance, in one example, the system 100 may be configured to transfer packets from NIC 120 to GPU 130 after receiving a set threshold number of packets, e.g., 16 packets, 32 packets, etc. In one example, the received packet(s) may be temporarily buffered in memory 122 of the NIC 120 until transferred to the GPU 130 in a small burst. In another example, the received packet(s) may be temporarily buffered in one or more registers of the NIC 120 until transferred to the GPU 130. In one example, the DD register may also be set when a packet-receive timer times out. For example, the threshold may be 32 packets. 30 packets may initially be received. However, a certain duration of time may pass during which no new packets are received. In such case, the DD register may be set so that the 30 packets that are received can be written to the GPU 130 and the packet processing performed without any further delay waiting for additional packets. In general, the threshold number of packets and the packet-receive threshold may be set based upon various factors including the register size(s) at NIC 120, the processing capabilities of GPU 130, the particular packet processing operations that the system 100 is tasked with performing, and so on.

When the packet (or packets) are not received and the DD register is not set, the NIC 120 may transmit a response to CPU 110 at stage 240 indicating that the packet(s) are not yet received. The CPU 110 may continue to poll NIC 120 for packet arrivals, repeating the polling stage 230. However, if at stage 235 it is determined that the register is set and the packet(s) has/have arrived, the response at stage 240 may provide a positive indication that the packet(s) are present.

In addition, when the packet(s) has/have arrived, e.g., when the threshold number of packets are received or the packet receive timer has timed out, the DMA engine of NIC 120 may initiate DMA transfer to the pinned memory pool of GPU 130 (stage 245). In one example, NIC 120 may proceed with the DMA transfer without instruction from the CPU 110. In particular, DMA engine of NIC 120 may write to the memory address indicated by the write pointer (e.g., in a first iteration of the process 200, to the start address received in the message of stage 220, and in subsequent iterations, to whichever is the current write address of the pinned memory buffer indicated by the write pointer) and place the packet(s) on the bus 180. The packet(s) may be received via host interface 135 and written directly into the pinned memory pool comprising a portion of shared memory 132.

In one example, NIC 120 may advance a write pointer based upon the number of packets transferred (and hence the size of the portion of the pinned memory pool that has been written to). In one example, when the packet-receive timer times out and less than a full burst of packets (e.g., 16 packets, 32 packets, etc.) is transferred, the NIC 120 may signal to CPU 110 the actual number of packets transferred. In another example, the NIC 120 may null pad the burst so that read and/or write pointers may remain synchronized between the NIC 120 and GPU 130 without explicit signaling of the number of packets transferred.

Next, at stage 250, control of process 200 returns to CPU 110. It should be noted that CPU 110 may be made aware of the DMA transfer of packet(s) to GPU 130 when a positive confirmation is received at stage 240. In other words, it is implied that NIC 120 has already sent or is in the process of sending the packet(s) when the DD register is set. Accordingly, CPU 110 may proceed to stage 255 and send a message to invoke one or more kernels for processing the packet(s). The message may be received by scheduler 131, for example, which may invoke one or more of the SMs 139 for packet processing in accordance with the kernel(s). It should be noted that there is an overhead involved in the scheduler 131 assigning SMs 139 to execute the kernel(s) (and/or threads). Accordingly, in one example, the threshold number of packets for setting the DD register may balance a goal of immediate packet processing for all packets with delays associated with scheduling the kernel(s). For instance, separately scheduling one or more kernel(s) on a per-packet basis may involve a large number of similar scheduling operations being repeated such that the overall throughput (number of packets processed in a given time period) is less than if kernels are assigned for packet processing for small chunks/bursts of 16 packets, 32 packets, etc.

At stage 260, the GPU executes the kernel(s) to process the packets. For instance, the execution of the kernel(s) may comprise the execution of a plurality of parallel threads at a plurality of cores of one or more of the SMs 139. The operations may include reading, processing, or modifying data in the pinned memory pool of shared memory 132. The operations may also include creating variables or other data structures and/or writing various output parameters to such variable or data structures. For instance, stage 260 may result in an output of a routing decision, the labeling of one or more packets with a label (e.g., for LSR), an incrementing of a flow counter, and so forth. In one example, such information may be written into one or more header fields of one or more packets for use by the NIC 120 or other devices. In one example, the kernel(s) may comprise the same set of instructions being performing in parallel across several SMs 139 and cores of the SMs 139. Alternatively, or in addition, the kernel(s) may comprise different serial or parallel operations that may be performed on a same packet, or a same set of packets. For instance, a first kernel may be for flow classification (e.g., identifying a flow type, such as a video stream, audio stream, text documents, etc.) in parallel with a second kernel for malware detection.

In one example, the scheduler 131 may maintain read and write pointers for accessing the pinned memory pool. The scheduler 131 may also instruct different SMs 139 to access different packets at different addresses in accordance with the read and write pointers. For instance, if 32 packets are written into the pinned memory pool at stage 245 and the GPU 130 is configured for parallel processing of 32 packets, the scheduler 131 may determine a starting address for each packet, beginning at a current address stored in the read pointer and advancing to subsequent addresses based upon the size of the packets. The scheduler 131 may then provide the respective packet start addresses to the assigned SMs 139. In addition, the scheduler 131 may advance the read pointer based upon the overall data volume of the 32 packets.

At stage 265, the GPU 130 completes the packet processing and may send a notification to CPU 110 that the operations are complete. In one example, the SMs 139 of the GPU 130 may write the processed packets back to the pinned memory buffer using the same addresses from which the packets were read. In other words, the processed packets may overwrite those that were loaded at stage 245. In such an example, a write pointer may be incremented based upon a data size of the packets that were processed. At stage 270 the control of process 200 returns to CPU 110. At stage 275, the CPU 110 sends a command to the DMA engine of NIC 120 to read from the pinned memory pool of shared memory 132 at GPU 130.

At stage 280, the NIC 120 may read the packets from the pinned memory pool via DMA. For instance, the NIC 120 may issue a read command via the bus 180 directed to a current address of a read pointer associated with the shared memory pool. In addition, in one example, the NIC 120 may read out a portion of the pinned memory buffer based upon a size of the transfer at stage 245. The NIC 120 may also advance a read pointer in accordance with the starting address of the read pointer and the volume of data that is read via the DMA transfer of stage 280. In another example, the notification of stage 265 and the command of stage 275 may indicate a size/length of the portion of the pinned memory buffer to be read.

At stage 290, the packet(s) are transmitted via transceivers 124 and network links 190. For example, processor 121 may distribute the packet(s) to transceivers 124 for routing via one of the network links 190 that may be selected in accordance with one or more routing criteria. For instance, as discussed above, routing criteria may be written into a packet header by the GPU 130 at stage 260. It should be noted that in one example, the packet(s) are not copied into NIC memory before being placed back on the wire. However, in one example, the packet(s) may be loaded into one or more transmit buffers (e.g., a hardware registers) to implement policy (e.g., layer 1/physical layer policy processing). Following stage 290, the process 200 ends. However, it should be understood that in various examples, all or a portion of the process 200 may continue as additional packets are received by NIC 120. For instance, after or as a part of stage 245, the DD register of NIC 120 may be reset. Operations or stages 230-290 may then continue for as long as the system 100 remains powered on and in operation.

Figure 3:
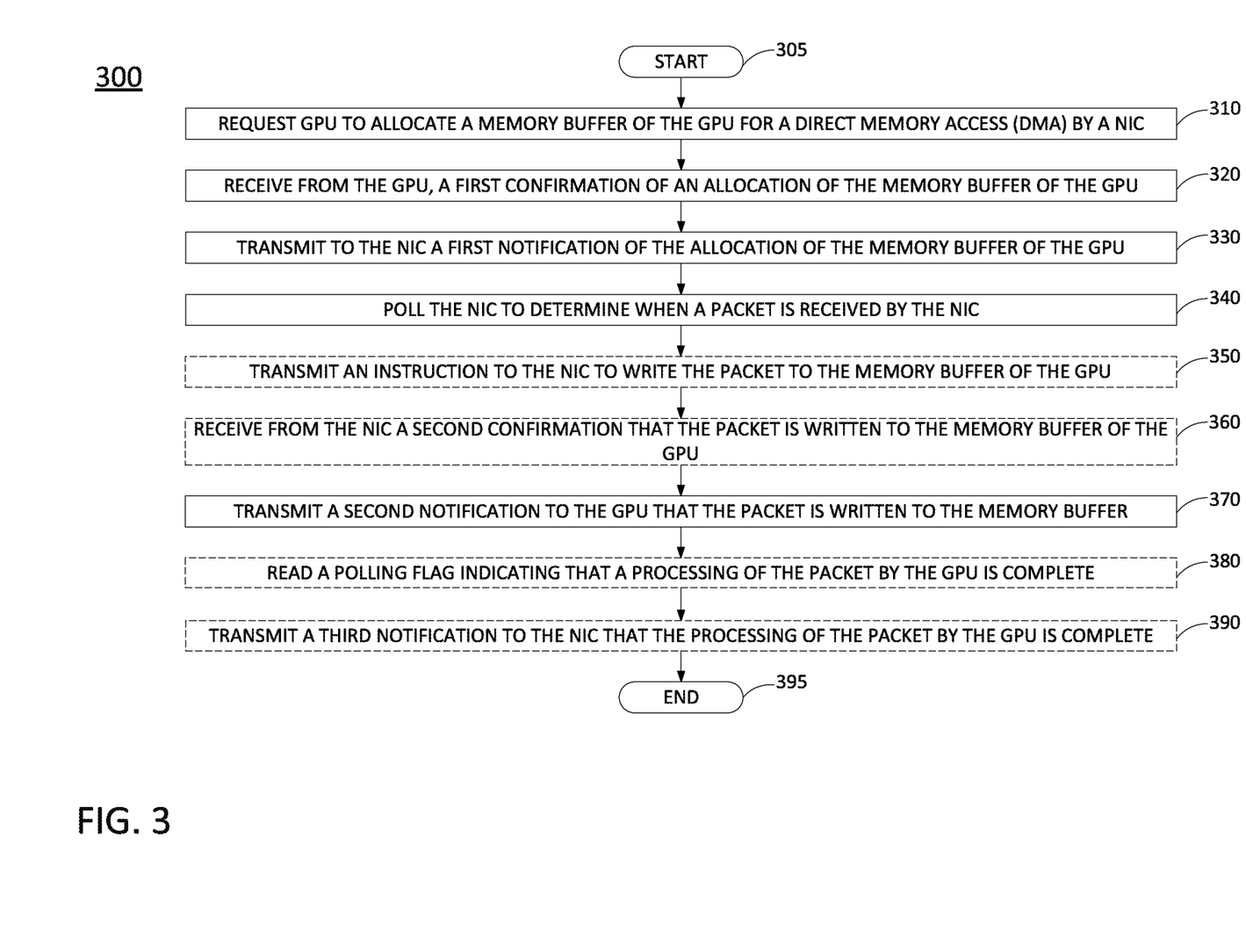
FIG. 3 illustrates a flowchart of an example method for coordinating a direct memory access for a network interface card to a graphics processing unit.

FIG. 3 illustrates a flowchart of an example method 300 for coordinating a direct memory access for a network interface card to a graphics processing unit. In one example, the method 300 is performed by a device such as CPU 110 of FIG. 1, by CPU 110 in conjunction with one or more other devices, such as NIC 120 and/or GPU 130, or by the system 100 in general. Alternatively, or in addition, the steps, functions, or operations of method 300 may be performed by a device or system 600, and/or processor 602 as described in connection with FIG. 6 below. For instance, the system 600 may represent all or a portion of the system 100 of FIG. 1. For illustrative purposes, the method 300 is described in greater detail below in connection with an example performed by a CPU, such as CPU 110. The method begins in step 305 and proceeds to step 310.

At step 310, the CPU requests a GPU to allocate a memory buffer of the GPU for a direct memory access (DMA) by a NIC. In one example, step 310 may comprise the same or similar operations as stage 205 of the process 200 described above.

At step 320, the CPU receives from the GPU a first confirmation of an allocation of the memory buffer of the GPU. In one example, the first confirmation of the allocation of the memory buffer includes a starting memory address of the memory buffer. In addition, in one example, the first confirmation of the allocation of the memory buffer includes a size of the memory buffer. In one example, the GPU establishes the memory buffer as a shared ring buffer for the GPU and the NIC. In one example, the memory buffer comprises a pinned memory buffer (e.g., internal or local to the GPU).

At step 330, the CPU transmits to the NIC a first notification of the allocation of the memory buffer of the GPU. In one example, the first notification of the allocation of the memory buffer includes a starting memory address of the memory buffer. In addition, in one example, the first notification of the allocation of the memory buffer includes a size of the memory buffer. In one example, step 330 may comprise the same or similar operations as stage 220 of the process 200 described above.

At step 340, the CPU polls the NIC to determine when a packet is received by the NIC. In one example, the CPU reads a register configured to be set when there is a packet (or a plurality of packets) received, which may be referred to as a data delivery (DD) register. In one example, the NIC reads the register in response to the request and may transmit an affirmative or a negative response to the CPU. In one example, step 340 may comprise the same or similar operations as stage 230 of the process 200 described above.

At optional step 350, the CPU may transmit an instruction to the NIC to write the packet (or a plurality of packets) to the memory buffer of the GPU. In one example, the polling of step 340 and the transmitting of optional step 350 are performed in accordance with a user space process of the CPU. For instance, the user space process may comprise a user space input/output (UIO) module, such as a poll mode driver. In one example, the poll mode driver may comprise a Data Plane Development Kit (DPDK) process.

At optional step 360, the CPU may receive from the NIC a second confirmation that the packet (or plurality of packets) is written to the memory buffer of the GPU. In one example, the network interface card writes the packet(s) to the memory buffer of the GPU via the direct memory access (DMA).

At step 370, the CPU transmits a second notification to the GPU that the packet(s) is/are written to the memory buffer. In one example, the second notification may comprise an instruction to begin processing the packet(s). In one example, at step 370 the CPU may provide one or more kernels for the GPU to run via streaming multiprocessors (SMs) of the GPU. In another example, the GPU may already have persistent kernels loaded. In one example, step 370 may comprise the same or similar operations as stage 255 of the process 200 described above.

At optional step 380, the CPU reads a polling flag indicating that a processing of the packet(s) by the GPU is complete. For instance, the GPU may set a register for the poll mode driver of the CPU which, when read, indicates whether or not the packet processing is complete. It should be noted that in another example, the GPU may send a message to the CPU (e.g., an interrupt message), indicating that processing of the packet(s) is complete.

At optional step 390, the CPU transmits a third notification to the NIC that the processing of the packet(s) by the GPU is complete. In accordance with the third notification, the NIC may read the packet from the memory buffer via DMA when the packet processing is complete.

Following step 370, or one of the optional steps 380-390, the method 300 proceeds to step 395 where the method ends.

Figure 4:
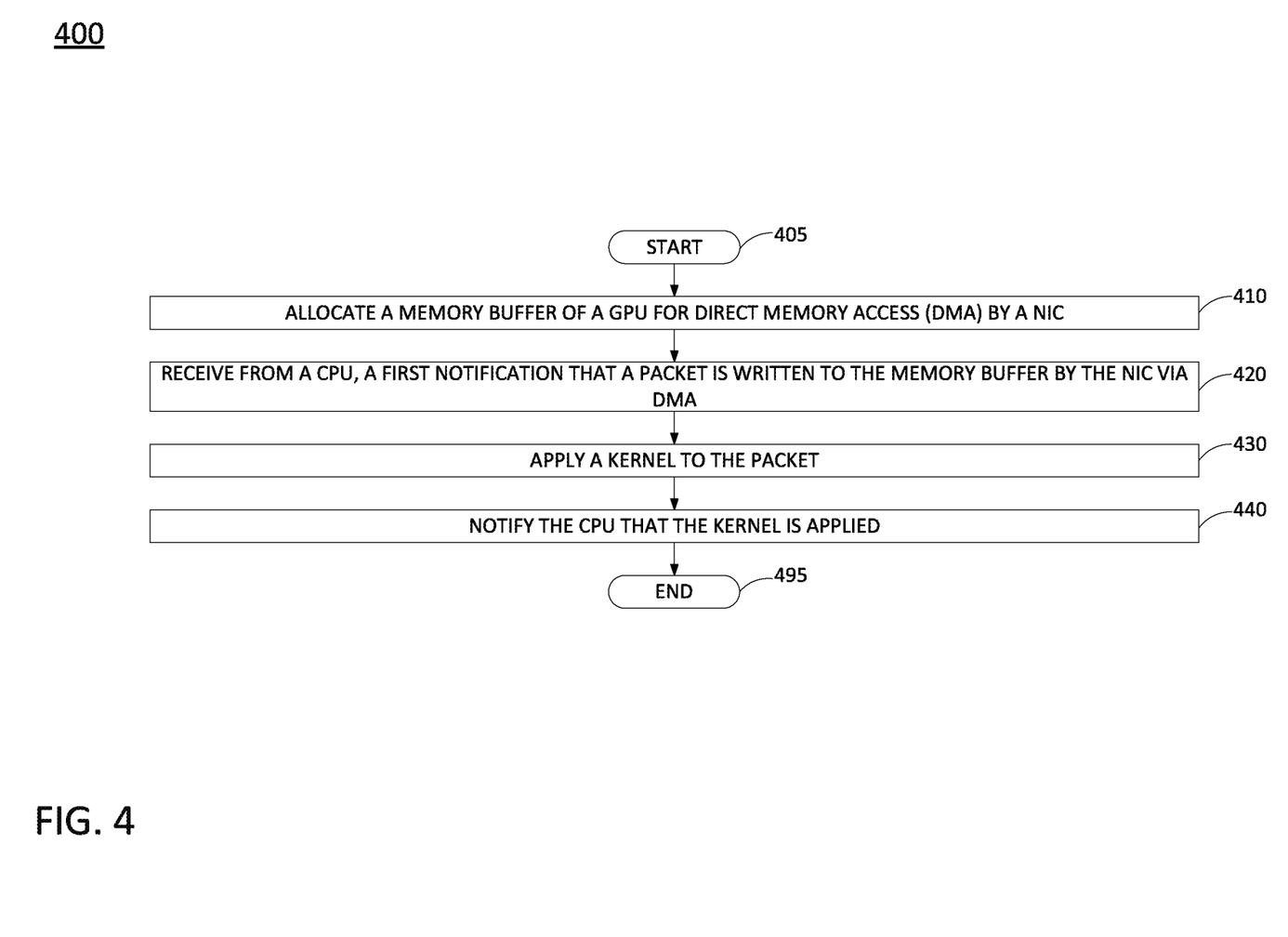
FIG. 4 illustrates a flowchart of an example method for establishing a direct memory access for a network interface card to a graphics processing unit.

FIG. 4 illustrates a flowchart of an additional example method 400 for establishing a direct memory access for a network interface card to a graphics processing unit. In one example, the method 400 is performed by a device such as GPU 130 of FIG. 1, by GPU 130 in conjunction with one or more other devices, such as NIC 120 and/or CPU 110, or by the system 100 in general. Alternatively, or in addition, the steps, functions, or operations of method 400 may be performed by a device or system 600, and/or processor 602 as described in connection with FIG. 6 below. For instance, the system 600 may represent all or a portion of the system 100 of FIG. 1. For illustrative purposes, the method 400 is described in greater detail below in connection with an example performed by a GPU, such as GPU 130. The method begins in step 405 and proceeds to step 410.

At step 410, the GPU allocates a memory buffer of the GPU for direct memory access (DMA) by a NIC. In one example, the memory buffer is a pinned memory buffer. In addition, in one example, the memory buffer may be allocated as a shared ring buffer for access by both the GPU and the NIC. In one example, step 410 may comprise the same or similar operations as stage 210 of the process 200 described above.

At step 420, the GPU receives from a CPU, a first notification that a packet (or a plurality of packets) is written to the memory buffer by the NIC via DMA. In one example, step 420 may comprise the same or similar operations as stage 255 of the process 200 described above.

At step 430, the GPU applies a kernel to the packet(s). In one example, the kernel comprises a persistent kernel. For instance, the kernel may remain in GPU memory beyond the end of the application of the kernel to the packet(s). Registers, variables, or other data structures may be reset, but the kernel does not need to be re-instantiated for the processing of subsequent packets that may be written into the memory buffer. In one example, step 430 may include assigning a plurality of streaming multiprocessors (SMs) to execute the kernel. In addition, in one example, step 430 may include assigning threads of the kernel to various cores of the SMs for processing the packet(s). In one example, step 440 may comprise the same or similar operations as stage 260 of the process 200 described above.

At step 440, the GPU notifies the CPU that the kernel is applied (e.g., that GPU-based packet processing is complete). In one example, step 440 may include the GPU setting a polling flag to indicate that the kernel is applied. For example, the CPU may read the polling flag, determine the GPU-based packet processing is complete, and provide a second notification to the NIC that the kernel is applied. In addition, the NIC may read the packet from the memory buffer via the DMA in response to the second notification. In one example, step 440 may comprise the same or similar operations as stage 265 of the process 200 described above.

Following step 440, the method 400 proceeds to step 495 where the method ends.

Figure 5:
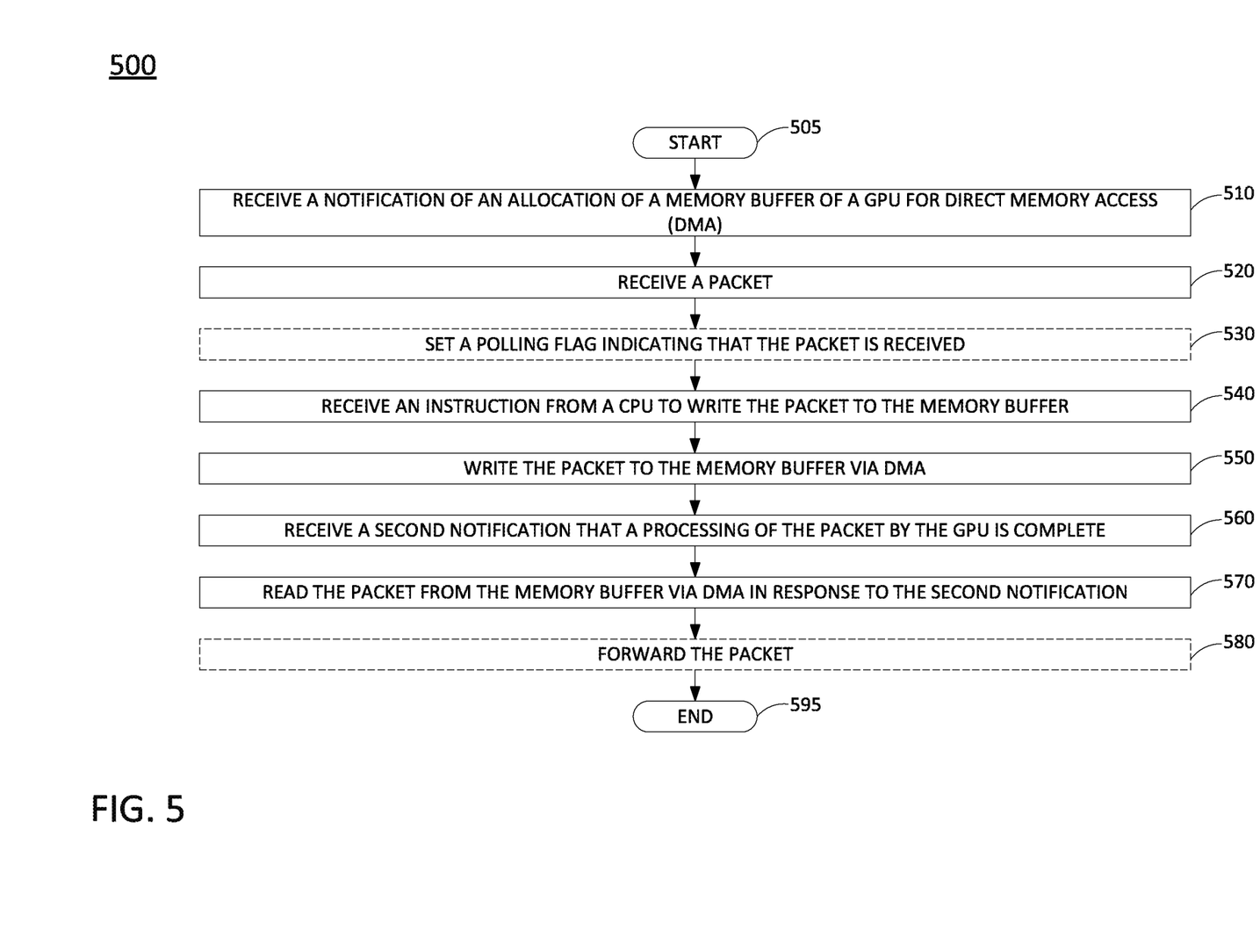
FIG. 5 illustrates a flowchart of an example method for a network interface card to access a graphics processing unit via a direct memory access.

FIG. 5 illustrates a flowchart of an example method 500 for a network interface card to access a graphics processing unit via a direct memory access. In one example, the method 500 is performed by a device such as NIC 120 of FIG. 1, by NIC 120 in conjunction with one or more other devices, such as CPU 110 and/or GPU 130, or by the system 100 in general. Alternatively, or in addition, the steps, functions, or operations of method 500 may be performed by a device or system 600, and/or processor 602 as described in connection with FIG. 6 below. For instance, the system 600 may represent all or a portion of the system 100 of FIG. 1. For illustrative purposes, the method 500 is described in greater detail below in connection with an example performed by a NIC, such as NIC 120. The method begins in step 505 and proceeds to step 510.

At step 510, the NIC receives a notification of an allocation of a memory buffer of a GPU for direct memory access (DMA). In one example, the notification may include a starting memory address of the memory buffer. In addition, in one example, the notification of the allocation of the memory buffer may include a size of the memory buffer. The NIC may initialize a DMA engine in accordance with the notification that is received, e.g., setting buffer start/end addresses, initializing read and write pointers, and so forth. In one example, step 510 may include operations in accordance with stages 220 and 225 of the process 200 described above.

At step 520, the NIC receives a packet (or a plurality of packets), e.g., from one or more network links via one or more NIC transceivers.

At optional step 530, the NIC may set a polling flag indicating that the packet(s) is/are received. For example, the polling flag may comprise a register (e.g., a data delivery (DD) register) that is set when one or more packets is/are received.

At optional step 540, the NIC may receive an instruction from a CPU to write the packet(s) to the memory buffer. In one example, the CPU sends the instruction in response to the polling flag being set at optional step 530.

At step 550, the NIC writes the packet(s) to the memory buffer via DMA. In one example, step 550 may comprise the same or similar operations as stage 245 of the process 200 described above. It should be noted that in one example, the receiving the packet at step 520 may comprise receiving a plurality of packets, and the writing the packet to the memory buffer at step 550 may comprise writing the plurality of packets to the memory buffer. In one example, the plurality of packets may comprise a number of packets that is set in accordance with a numerical threshold (e.g., 16 packets, 32 packets, etc.) or a number of packets that is determined based upon a timeout condition being reached. For instance, in one example a polling flag may be set at optional step 530 when a packet-receive timer times out. In addition, the CPU may read the polling flag and send an instruction that is received by the NIC at optional step 540. In another example, the NIC may automatically send the packet(s) when the timeout condition is reached.

At step 560, the NIC receives a second notification that a processing of the packet(s) by the GPU is complete. In one example, the second notification may be received from the CPU. In one example, step 560 may include operations in accordance with stage 275 of the process 200 described above.

At step 570, the NIC reads the packet from the memory buffer via DMA in response to the second notification. In one example, step 570 may comprise the same or similar operations as stage 280 of the process 200 described above At optional step 580, the NIC forwards the packet. In one example, step 570 may comprise the same or similar operations as stage 290 of the process 200 described above. Following step 570 or optional step 580, the method 500 proceeds to step 595 where the method ends.

It should be noted that any of the methods 300, 400, and 500 may be expanded to include additional steps or may be modified to include additional operations with respect to the steps outlined above, may be modified to omit certain steps, and so forth. For instance, in various examples, the respective methods 300, 400, and/or 500 may be combined in whole or in part. Similarly, any or all of methods 300, 400, and 500 may be repeated through various cycles of receiving packets at a NIC, writing packets to a GPU memory buffer via DMA, processing the packets at the GPU, and reading the packets back from the GPU memory buffer by a NIC via DMA. In one example, the respective methods 300, 400, and/or 500 may be modified or expanded to include any operations described above in connection with the example process 200 of FIG. 2. In still other examples, the methods 300 and 400 may be expanded to include loading a kernel to a GPU from a CPU, the methods 300 and 500 may be expanded to include loading a DMA engine into NIC memory from a CPU, and so forth. Thus, these and other modifications are all contemplated within the scope of the present disclosure.

In addition, although not specifically specified, one or more steps, functions or operations of the respective methods 300-500 may include a storing, displaying and/or outputting step as required for a particular application. In other words, any data, records, fields, and/or intermediate results discussed in the method can be stored, displayed and/or outputted either on the device executing the method or to another device, as required for a particular application. Furthermore, steps, blocks, functions or operations in any of FIGS. 3-5 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

FIG. 6 depicts a high-level block diagram of a computing device or processing system specifically programmed to perform the functions described herein. As depicted in FIG. 6, the processing system 600 comprises one or more hardware processor elements 602 (e.g., a central processing unit (CPU), a microprocessor, or a multi-core processor, a co-processor, such as a GPU, and so forth), a memory 604 (e.g., random access memory (RAM) and/or read only memory (ROM)), a module 605 for coordinating a direct memory access for a network interface card to a graphics processing unit, for establishing a direct memory access for a network interface card to a graphics processing unit, and/or for a network interface card to access a graphics processing unit via a direct memory access, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 606 may also include transceivers, power units, and so forth. Although only one processor element is shown, it should be noted that the computing device may employ a plurality of processor elements. Furthermore, although only one computing device is shown in the figure, if the method 300, method 400, or method 500 as discussed above is implemented in a distributed or parallel manner for a particular illustrative example, i.e., the steps of the above method 300, method 400, or method 500, or the entire method 300, method 400, or method 500 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300, method 400, or method 500. In one example, instructions and data for the present module or process 605 for coordinating a direct memory access for a network interface card to a graphics processing unit, for establishing a direct memory access for a network interface card to a graphics processing unit, and/or for a network interface card to access a graphics processing unit via a direct memory access (e.g., a software program comprising computer-executable instructions) can be loaded into memory 604 and executed by hardware processor element 602 to implement the steps, functions or operations as discussed above in connection with the illustrative method 300, method 400, and/or method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for coordinating a direct memory access for a network interface card to a graphics processing unit, for establishing a direct memory access for a network interface card to a graphics processing unit, and/or for a network interface card to access a graphics processing unit via a direct memory access (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    requesting, by a central processing unit, a graphics processing unit to allocate a memory buffer of the graphics processing unit for a direct memory access by a network interface card;
    receiving, by the central processing unit from the graphics processing unit, a first confirmation of an allocation of the memory buffer of the graphics processing unit;
    transmitting, by the central processing unit to the network interface card, a first notification of the allocation of the memory buffer of the graphics processing unit;
    polling, by the central processing unit, the network interface card to determine when a packet is received by the network interface card; and
    transmitting, by the central processing unit, a second notification to the graphics processing unit that the packet is written to the memory buffer.

2. The method of claim 1, wherein the network interface card writes the packet to the memory buffer of the graphics processing unit via the direct memory access.

3. The method of claim 1, further comprising:
    transmitting, by the central processing unit, an instruction to the network interface card to write the packet to the memory buffer of the graphics processing unit; and
    receiving, by the central processing unit from the network interface card, a second confirmation that the packet is written to the memory buffer of the graphics processing unit, wherein the second notification is transmitted in response to the second confirmation.

4. The method of claim 3, wherein the polling and the transmitting the instruction are performed in accordance with a user space process of the central processing unit.

5. The method of claim 4, wherein the user space process comprises a poll mode driver.

6. The method of claim 4, wherein the user space process comprises a user space input output module.

7. The method of claim 1, further comprising:
    reading, by the central processing unit, a polling flag indicating that a processing of the packet by the graphics processing unit is complete; and
    transmitting, by the central processing unit, a third notification to the network interface card that the processing of the packet by the graphics processing unit is complete.

8. The method of claim 7, wherein the network interface card reads the packet from the memory buffer via the direct memory access.

9. The method of claim 7, wherein the network interface card reads a routing instruction for the packet from the memory buffer.

10. The method of claim 1, wherein the graphics processing unit establishes the memory buffer as a shared ring buffer for the graphics processing unit and the network interface card.

11. The method of claim 1, wherein the memory buffer comprises a pinned memory buffer.

12. A method comprising:
    allocating, by a graphics processing unit, a memory buffer of the graphics processing unit for a direct memory access by a network interface card;
    receiving, by the graphics processing unit from a central processing unit, a first notification that a packet is written to the memory buffer by the network interface card via the direct memory access;
    applying, by the graphics processing unit, a kernel to the packet; and
    notifying, by the graphics processing unit, the central processing unit that the kernel is applied.

13. The method of claim 12, wherein the kernel comprises a persistent kernel.

14. The method of claim 12, wherein the notifying comprises:
    setting, by the graphics processing unit, a polling flag to indicate that the kernel is applied, wherein the central processing unit reads the polling flag and provides a second notification to the network interface card that the kernel is applied, wherein the network interface card reads the packet from the memory buffer via the direct memory access in response to the second notification.

15. A method comprising:
    receiving, by a network interface card from a central processing unit, a first notification of an allocation of a memory buffer of a graphics processing unit for a direct memory access;
    receiving, by the network interface card, at least one packet;

writing, by the network interface card, the at least one packet to the memory buffer via the direct memory access;

receiving, by the network interface card from the central processing unit, a second notification that a processing of the at least one packet by the graphics processing unit is complete; and reading, by the network interface card in response to the second notification, the at least one packet from the memory buffer via the direct memory access.

16. The method of claim 15, further comprising:

forwarding, by the network interface card, the at least one packet that is read from the memory buffer.

17. The method of claim 15, further comprising:

setting, by the network interface card, a polling flag indicating that the at least one packet is received; and receiving, by the network interface card, an instruction from the central processing unit to write the at least one packet to the memory buffer.

18. The method of claim 15, wherein the receiving the at least one packet comprises receiving a plurality of packets, and wherein the writing the at least one packet to the memory buffer comprises writing the plurality of packets to the memory buffer, and wherein the plurality of packets comprises a number of packets that is set in accordance with a numerical threshold.

19. The method of claim 15, wherein the receiving the at least one packet comprises receiving a plurality of packets, and wherein the writing the at least one packet to the memory buffer comprises writing the plurality of packets to the memory buffer, wherein the plurality of packets comprises a number of packets that is based upon a timeout condition being reached.

20. The method of claim 15, further comprising:

determining, by the network interface card, at least one routing instruction for the at least one packet.

\* \* \* \* \*